Patented Feb. 25, 1930

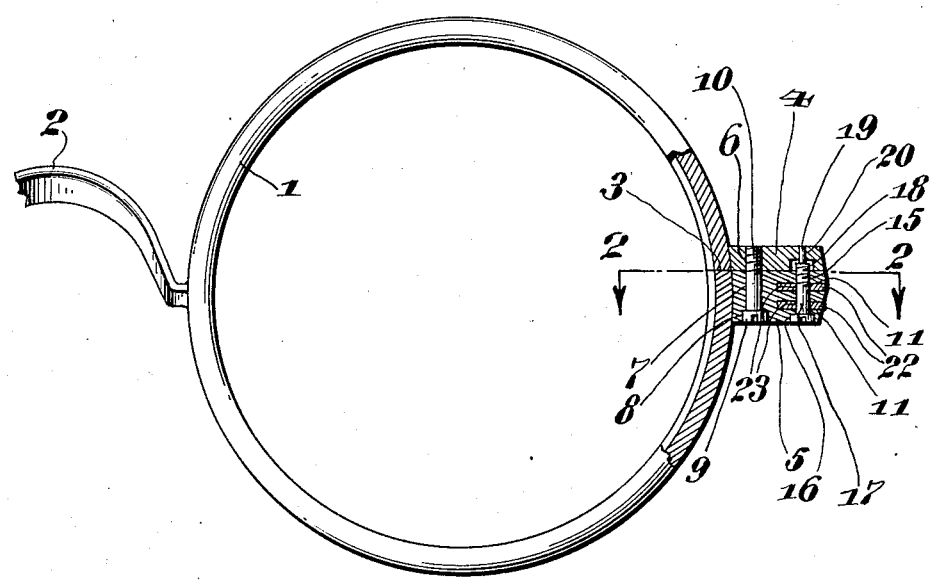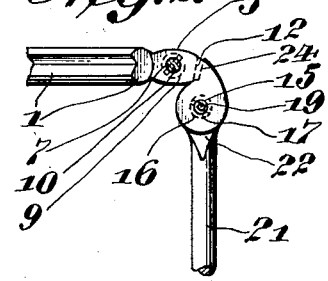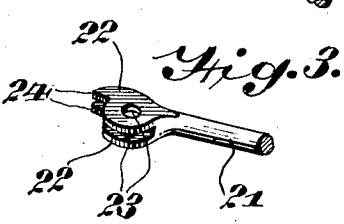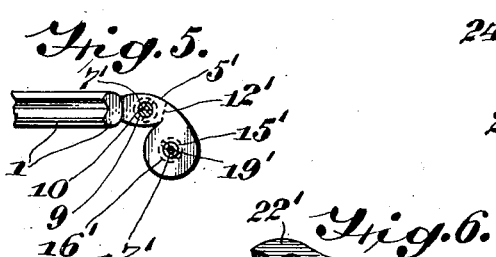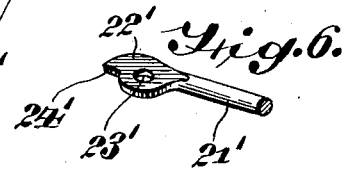

1,748,245

UNITED STATES PATENT OFFICE

HENRY ROTH, OF IRVINGTON, NEW JERSEY, ASSIGNOR, BY MESNE ASSIGNMENTS, TO CONTINENTAL OPTICAL MANUFACTURING COMPANY, OF INDIANAPOLIS, INDIANA, A CORPORATION OF INDIANA

OPHTHALMIC MOUNTING

Application filed December 15, 1925. Serial No. 75,491.

My invention relates to ophthalmic mountings and has particular relation to the means for connecting the temple wires to the opposing split ends of the rims of a spectacle frame.

One object of the invention is to provide a temple connection including means whereby the friction between the pivot or butt ends of the temple wires and the temple lugs may be adjusted or varied.

It is also an object of the invention to provide means whereby the temple lugs which are mounted upon the opposing split ends of the lens rims of a spectacle frame may be disconnected and separated from each other for the purpose of inserting lenses in the rims without disturbing in any way the connection between the temple wires and the temple lugs.

In order that the invention may be more readily understood and its practical advantages fully appreciated reference may be had to the accompanying drawing in which I have shown one form of a convenient embodiment of the same.

In the drawing:

Fig. 1 is a view showing a portion of one-half part of a spectacle frame in rear elevation and the remaining portion thereof including the means for connecting a temple to the frame in section, the said section being taken in a central plane parallel with the front and rear sides of the rim, the temple pivot being shown displaced or distorted from its actual relative position with respect to other parts of the structure for convenience of illustration;

Fig. 2 is a view taken on the line 2—2 of Fig. 1;

Fig. 3 is a view showing the inner or pivot end portion of a temple wire in perspective;

Fig. 4 is a view partly in section and partly in rear elevation showing a modified construction of temple connection, the temple pivot being shown displaced or distorted from its actual relative position with respect to other parts of the structure for convenience of illustration;

Fig. 5 is a view taken on the line 5—5 of Fig. 4; and

Fig. 6 is similar to Fig. 3 showing a modified construction of temple wire.

Referring to the drawing: 1 designates the rim of a pair of eyeglasses which is connected by means of a bridge 2 to another rim, not shown. The rim is split, as indicated at 3.

Referring now to Figs. 1 to 3 of the drawing, it will be noted that to the opposing end portions of the rim 1 temple lugs 4 and 5 are connected. The temple lug 4 is quite thin relatively to the temple lug 5. The lug 4 is provided with a screw-threaded opening 6, while the lug 5 is provided with a smooth opening 7 having an enlarged portion 8 at its outer end which is adapted to receive the head 9 of a fastening screw 10.

The temple lug 5 is provided with parallel inwardly extending slots 11 which terminate in shoulders, as indicated at 12 by dotted lines in Fig. 2. The lug 5 is provided with a hole 15 which extends therethrough, the outer end of which is enlarged, as indicated at 16. The inner end is screw-threaded for engagement with the inner screw-threaded end of a pivot screw 17, the outer end of which is provided with a slotted head which is seated within the enlargement 16 of the hole 15. The inner end of the pivot screw 17 terminates in a recess 18 upon the inner side of the temple lug 4. The inner end of the pivot screw is provided with a smooth extension 19 of reduced diameter which projects into a smooth hole or opening 20 leading outwardly from the recess 18. The engagement of the smooth portion 19 with the hole or opening 20 constitutes a binding anchorage which cooperates with the fastening or connecting screw 10 to prevent distortion of the temple lugs with respect to each other.

The inner pivot ends of each temple 21 is provided with ears 22 which are adapted to be located within the slots 11. These ears are provided with holes or openings 23 through which the pivot screw 17 is adapted to extend and to effect pivotal connection between the temple wire and the temple lug 5. It will be seen that the temple lug 4 is not in any way fastened to the temple pivot 17 and that upon removal of the fastening screw 10 the lugs 4 and 5 may be separated from each other for the purpose of inserting or removing lenses from the rim 1 without disturbing the temple connection. The ears 22 are provided with shoulders 24 which are adapted to engage with the shoulders 12, previously referred to, to limit the outward pivotal movement of the temples.

Referring now to Figs. 4 to 6 of the drawing, it will be noted that the temple lugs 4' and 5' are respectively provided with openings 6' and 7' extending therethrough, the former being screw-threaded and the latter being provided with an enlargement, as indicated at 8', for the reception of the head 9 of a fastening screw 10.

The outer end portion of the lug 5' is provided with a single slot 11'. The temple lug 5' is provided with an opening 15', the inner end of which is screw-threaded, while the outer end of which is enlarged, as indicated at 16', for the reception of the slotted head of a pivot screw 17', the inner end of which is screw-threaded for engagement with the screw-threaded inner end of the hole or opening 15'. The inner end of the pivot screw terminates within a recess 18' upon the inner side of the outer end portion of the lug 4'. The inner end of the pivot screw 17' is provided with a smooth extension 19' of reduced size which is adapted to engage a hole 20' of corresponding size which extends outwardly from the bottom of the recess 18'. The inner pivot end of the temple 21' is provided with a single flattened bearing portion 22' through which a hole or opening 23' extends. The portion 22' is adapted to be placed within the slot 11' and the hole therethrough is adapted to be engaged by the pivot screw 17'. Upon tightening the pivot screw 17' the portions of the lug 5' upon opposite sides of the slot 11' are caused to clamp against the opposite sides of the portion 22' of the temple wire 21'. The pivot end portion 22' is provided with a shoulder 24' which is adapted to engage a shoulder 12' at the inner end of the slot 11' and thereby limit the outer pivotal movement of the temple wire.

The reduced extension 19' of the pivot screw 17' which is in engagement with the reduced opening 20' through the lug 4' cooperates with the fastening screw 10 to prevent distortion of the said lugs with respect to each other due to strains to which the same are subjected in use.

It will be seen that in both forms of construction embodying the invention I am enabled, by removal of the screw 10 which screws and fastens the temple lugs together, to separate the said lugs which are attached to the opposing split ends of the rims for the purpose of inserting or removing lenses therefrom without in any way disturbing the connection of the temple wires 21 or 21' with the said temple lugs.

It will also be seen that in both forms of construction the temple screw 17 and 17' are of lengths such that the inner ends thereof are spaced from the bottoms of the recesses 18 and 18' in the lugs or ears 4 and 4'. In view of this relationship it is obvious that the said screws may be adjusted or screwed inwardly to greater or less extent and that by thus adjusting the said screws the pressure of the portions of the lugs 5 and 5' which contact with the pivot or butt end portions 22 or 22' of the pivot wires is adjusted or varied, thereby adjusting or varying the friction between the relatively moving surfaces of the said pivot ends and the portions of the temple lugs with which they contact.

Having thus described my invention, what I claim and desire to secure by Letters Patent is:

1. An ophthalmic mounting for spectacle frames with split rims comprising temple lugs, one of which is provided with an inwardly extending slot in its outer end and also is provided with a hole extending therethrough, the inner end of which is screw-threaded, a pivot screw extending through said hole and having engagement with the screw-threaded portion thereof, the inner end of the said pivot screw being provided with a reduced smooth extension which is in engagement with a hole in the outer end portion of the other of the said temple lugs, and a temple wire having a pivot portion mounted within the said slot and in pivotal engagement with the said pivot screw, substantially as and for the purpose described.

2. An ophthalmic mounting for spectacle frames with split rims comprising temple lugs secured to the adjacent opposing ends of each of said rims, means for detachably fastening the said lugs together, one of the said lugs being provided with slots extending inwardly from its outer end and also having a hole extending transversely therethrough and the other of said lugs being provided with a recess upon its inner side and with a hole extending outwardly from the bottom of said recess, a pivot mounted within the hole through the first-named lug, said pivot being provided with a reduced extension upon its inner end, which extension is adapted to engage the reduced hole extending from the bottom of said recess, means for retaining the pivot in said hole, and a temple having ears mounted in said slots, which ears are provided with openings through which the said pivot extends.

3. An ophthalmic mounting for spectacle frames with split rims comprising temple lugs secured to the adjacent opposing ends of a rim, means for detachably fastening the said lugs together, one of the said lugs being provided with a slot extending inwardly from its outer end and also being provided with a hole extending transversely through its outer end portion, the inner end of said hole being screw-threaded and the other of said lugs being provided with a recess upon its inner side in alinement with the said hole and said other lug being also provided with a relatively small hole extending from the bottom of said recess outwardly therethrough, a pivot screw mounted within the hole through the first-named lug and having screw-threaded engagement with the inner end portion thereof and the said pivot screw being provided with a reduced extension projecting forwardly from its inner end and engaging with the relatively small opening leading from the bottom of the recess and the other of said lugs, and a temple wire, the pivot end of which has a hole extending therethrough, said pivot end adapted to be located within the said slot and the said pivot screw extending through the hole through said pivot end, substantially as and for the purpose described.

4. An ophthalmic mounting for spectacle frames with split rims, comprising temple lugs secured to the adjacent opposing ends of a rim, means for detachably fastening said lugs together, one of the said lugs being provided with a slot extending inwardly from its outer end and also being provided with a hole extending transversely through its outer end portion, the inner end of said hole being screw-threaded and the other of said lugs being provided with a hole extending therethrough in alinement with the hole in the first named lug, a pivot screw mounted within the hole through the first named lug and having screw-threaded engagement with the inner end portion thereof, the portion of said pivot screw beyond the screw-threaded portion thereof extending through the hole in the second named lug, and a temple wire, the pivot end of which has a hole extending therethrough, said pivot end adapted to be located within the said slot, and the said pivot screw extending through the hole through said pivot end.

5. An ophthalmic mounting for spectacle frames with split rims, comprising temple lugs, means for detachably fastening said lugs together, a slot in one of said lugs, a temple wire having an ear mounted in said slot, a pivot screw extending through said lug and the ear of the temple bar and having an extension, said pivot screw being independent of said means which detachably fastens said lugs together, and a hole in the rear of the other of said temple lugs with which said extension is in engagement.

6. An ophthalmic mounting for spectacle frames with split rims, comprising temple lugs, one of which is provided with an inwardly extending slot in its outer end and also is provided with a hole extending therethrough the inner end of which is screw-threaded, a pivot screw extending through said hole and having engagement with the screw-threaded portion thereof, the inner end of the said pivot screw being provided with means for engagement with the rear of the other of the said temple lugs, and a temple wire having a pivot portion mounted within the said slot and in pivotal engagement with the said pivot screw.

In testimony that I claim the foregoing as my invention, I have hereunto signed my name this 8th day of Dec., A. D., 1925.
HENRY ROTH.